United States Patent
Hagiuda et al.

(10) Patent No.: US 6,804,461 B1
(45) Date of Patent: Oct. 12, 2004

(54) FLASH APPARATUS AND AUXILIARY BATTERY APPARATUS

(75) Inventors: Nobuyoshi Hagiuda, Yokohama (JP); Masakuni Ohta, Ohta-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/663,810

(22) Filed: Sep. 17, 2003

(30) Foreign Application Priority Data

Sep. 18, 2002 (JP) ........................................ 2002-271150

(51) Int. Cl.⁷ .......................... G03B 15/03; H02M 2/10
(52) U.S. Cl. ...................... 396/203; 396/205; 396/277; 396/279; 362/9; 307/150; 429/98
(58) Field of Search ................................ 396/203, 205, 396/206, 277, 278, 279, 301; 315/241 P; 307/80, 150; 362/2, 8, 9; 429/96–100

(56) References Cited

U.S. PATENT DOCUMENTS

| | | | | |
|---|---|---|---|---|
| 3,528,352 A | * | 9/1970 | Yoshizo | 396/206 |
| 3,855,534 A | * | 12/1974 | Holcomb et al. | 455/349 |
| 4,427,280 A | * | 1/1984 | Iwashita et al. | 396/303 |
| 4,510,419 A | * | 4/1985 | Takematsu | 315/241 P |
| 4,525,055 A | * | 6/1985 | Yokoo | 396/279 |
| 5,164,761 A | * | 11/1992 | Isono et al. | 396/279 |
| 6,289,179 B1 | * | 9/2001 | You | 396/205 |

FOREIGN PATENT DOCUMENTS

JP     A 61-171099     8/1986     ............ H05B/41/30

* cited by examiner

*Primary Examiner*—W. B. Perkey
(74) *Attorney, Agent, or Firm*—Oliff & Berridge, PLC

(57) ABSTRACT

A flash apparatus operates on power supplied from internal batteries and an external battery in an auxiliary battery apparatus. A battery check is executed by detecting the charge speed at which a main capacitor is charged and comparing the charge speed with a threshold value. The threshold value is set higher when the auxiliary battery apparatus is mounted than the threshold value set when the auxiliary battery apparatus is not mounted. Thus, an accurate battery check reflecting the presence/absence of the auxiliary battery apparatus can be achieved.

12 Claims, 18 Drawing Sheets

FLASH APPARATUS AND AUXILIARY BATTERY APPARATUS

INCORPORATION BY REFERENCE

The disclosure of the following priority application is incorporated herein by reference: Japanese Patent Application No. 2002-271150 filed Sep. 18, 2002

BACKGROUND OF THE INVENTION

1. Field of the Invention

The present invention relates to a flash apparatus on which an auxiliary battery apparatus can be mounted and the auxiliary battery apparatus.

2. Description of the Related Art

There are flash apparatuses for cameras in the related art, with which auxiliary battery apparatuses can be used (see, for instance, Japanese Laid Open Patent Publication No. S61-171099). Such. use of an auxiliary battery apparatus mounted at a flash apparatus is enabled by linking the auxiliary battery apparatus to the flash apparatus main body so as to connect the batteries in the auxiliary battery apparatus in parallel to or in series with the batteries in the flash apparatus.

The battery power in a flash apparatus can be checked based upon the speed at which the main capacitor is charged. The battery check can be achieved by judging that there is a sufficient level of battery power remaining if the charge speed is high and judging that the available battery power is becoming depleted if the charge speed is low. The results of the judgment indicated at a display unit allows the user to ascertain at any time whether or not the batteries need to be replaced.

However, in the case of a battery check in a flash apparatus that allows the use of an auxiliary battery apparatus as described above, the level of available power remaining in the individual batteries corresponding to a given charge speed when the auxiliary battery apparatus is used is different from the level of the available power remaining in the individual batteries at the same charge speed when the auxiliary battery apparatus is not used, due to the difference in the number of batteries. Unless this issue is appropriately addressed, the remaining battery power of batteries nearing the end of their service life may be erroneously indicated as sufficient when the auxiliary battery apparatus is used, which may then lead to a problem of the user being caught unprepared for a sudden depletion of the batteries during operation. In addition, if a battery having reached the end of its service life is continuously used with charged batteries, that battery becomes reverse charged, and an internal gas is generated by the pole reversal phenomenon, resulting in a problem such as a liquid leak.

SUMMARY OF THE INVENTION

The flash apparatus according to the present invention comprises a light emission unit that emits light with an electric charge stored at a main capacitor, a battery chamber in which an internal battery constituting a source battery is loaded, a mounting unit at which an auxiliary battery apparatus having loaded therein an external battery to be connected in series with the internal batteries is detachably mounted and a detector that detects whether or not the auxiliary battery apparatus is mounted.

The flash apparatus further comprises a battery check circuit that detects a charge speed at which the main capacitor is charged and generates one of an output corresponding to remaining battery power available in the internal battery and an output corresponding to remaining battery power available in the internal battery and the external battery based upon the charge speed and results of a detection executed by the detector.

It is desirable that the battery check circuit be capable of generating the output corresponding to the remaining battery power by comparing the detected charge speed with a threshold value for battery check. The battery check circuit should raise the threshold value when the detector detects that the auxiliary battery apparatus is mounted compared to the threshold value set when the presence of the auxiliary battery apparatus is not detected. By varying the threshold value in this manner, it becomes possible to detect the remaining battery power with a high degree of accuracy both when the auxiliary battery apparatus is mounted and when the auxiliary battery apparatus is not mounted.

The auxiliary battery apparatus according to the present invention that can be detachably mounted at an electric apparatus comprises a battery loading unit that allows an external battery to be loaded therein and can be detachably mounted at the electric apparatus in place of a lid of a battery chamber of the electric apparatus, an electric connection member that connects an external battery loaded in the battery loading unit to an internal battery loaded in the battery chamber of the electric apparatus as the battery loading unit is mounted, and a lid mounting unit provided at the battery loading unit, to which the lid can be attached. In this auxiliary battery apparatus, the battery in the battery loading unit is concealed as the lid is attached at the lid mounting unit. Since the lid of the electric apparatus can be attached to the auxiliary battery apparatus, it is not allowed to go missing easily.

It is desirable that the auxiliary battery apparatus further include a lock mechanism which disallows removal of the battery loading unit from the electric apparatus by interlocking with attachment of the lid at the battery loading unit and allows the battery loading unit to be disengaged by interlocking with detachment of the lid.

The battery loading unit may include a battery support bed that supports the external battery and can be detachably mounted at the electric apparatus and a battery cover that is positioned and set so as to enclose the external battery supported by the battery support bed. As the battery cover is positioned and set at the battery support bed and the lid is attached at the battery cover, the battery support bed and the battery cover come to constitute an integrated unit via the lid, and as the lid is detached, the battery support bed and the battery cover become disengaged from each other, thereupon ceasing to constitute the integrated unit.

The electric apparatus may be, for instance, a flash apparatus for a camera.

A flash system or an electric system with auxiliary batteries according to the present invention may assume the following structure. Namely, the system comprises the flash apparatus or the electric apparatus described above and the auxiliary battery apparatus described above, the internal battery and the external battery are each cylindrical in shape, an internal battery space where a plurality of cylindrical batteries are loaded side-by-side in a row is formed at the battery chamber and an external battery space where a single cylindrical battery constituting the external battery is loaded so that the axis of the external battery extends along a direction of the row in which the plurality of cylindrical batteries are arranged is formed at the auxiliary battery apparatus.

DESCRIPTION OF THE PREFERRED EMBODIMENTS

First Embodiment

The first embodiment of the present invention is now explained in reference to FIGS. 1 to 8.

Figure 1:
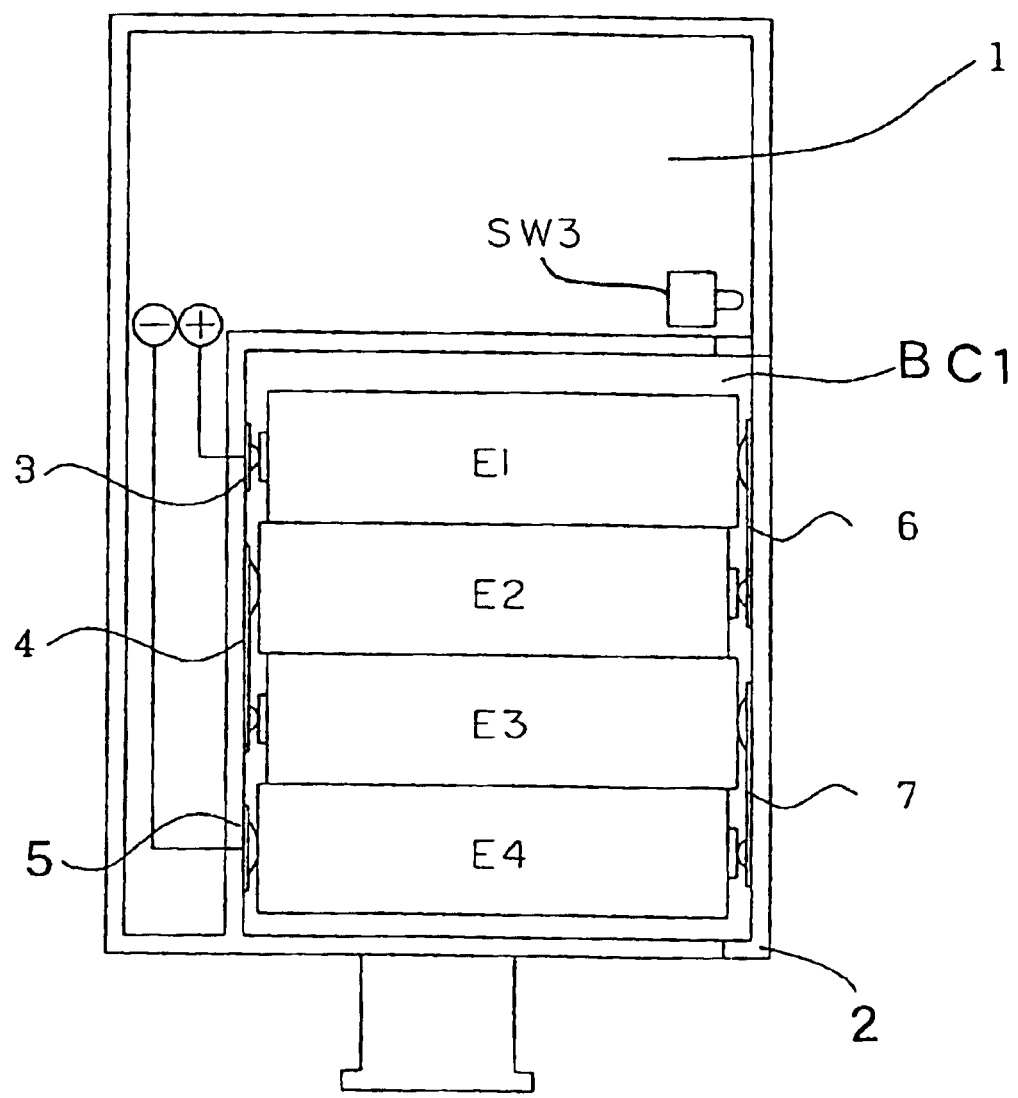
FIG. 1 is a frontal cross-section of a flash apparatus achieved in an embodiment of the present invention.
Figure 2:
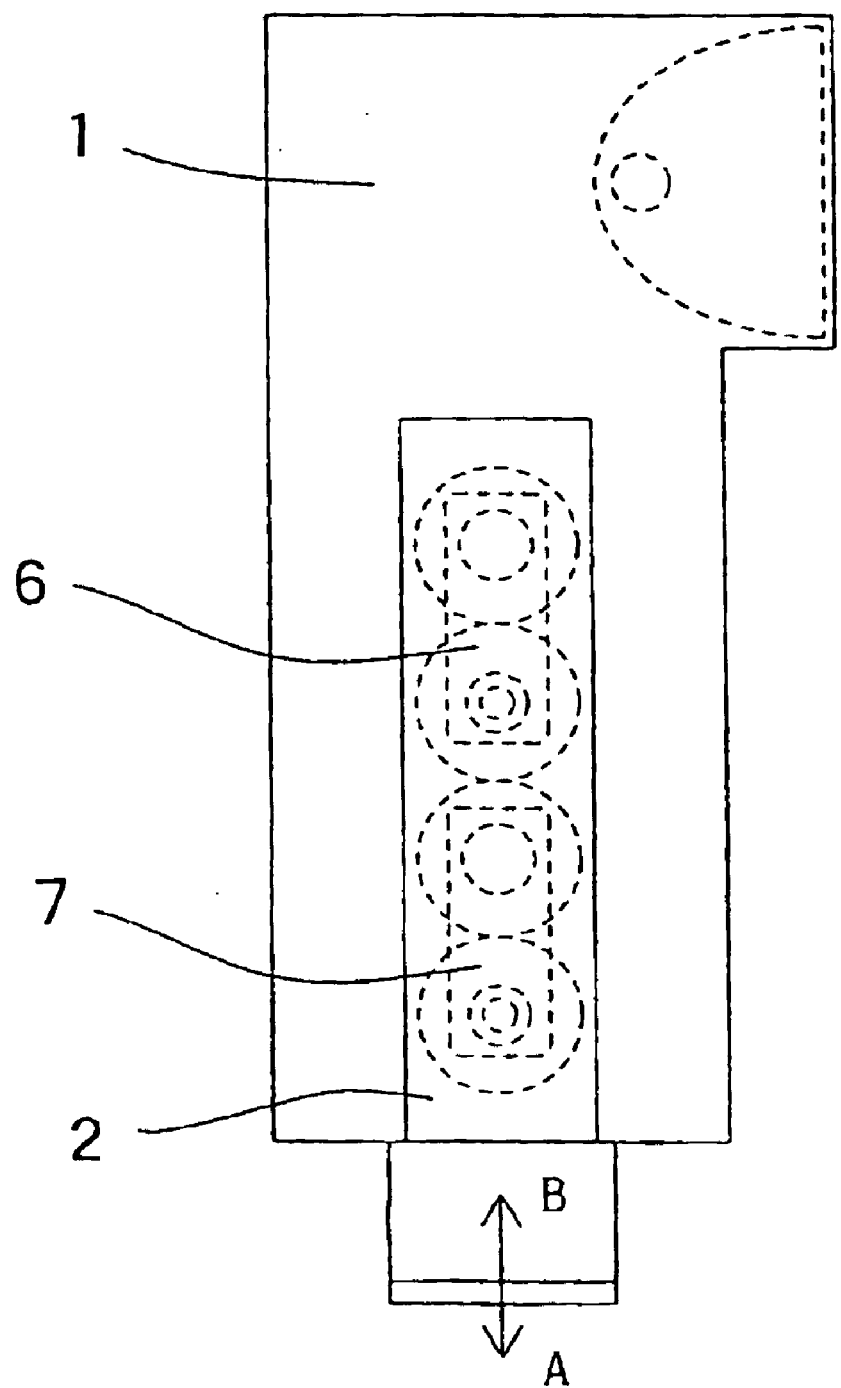
FIG. 2 is a right side elevation of FIG. 1.
Figure 3:
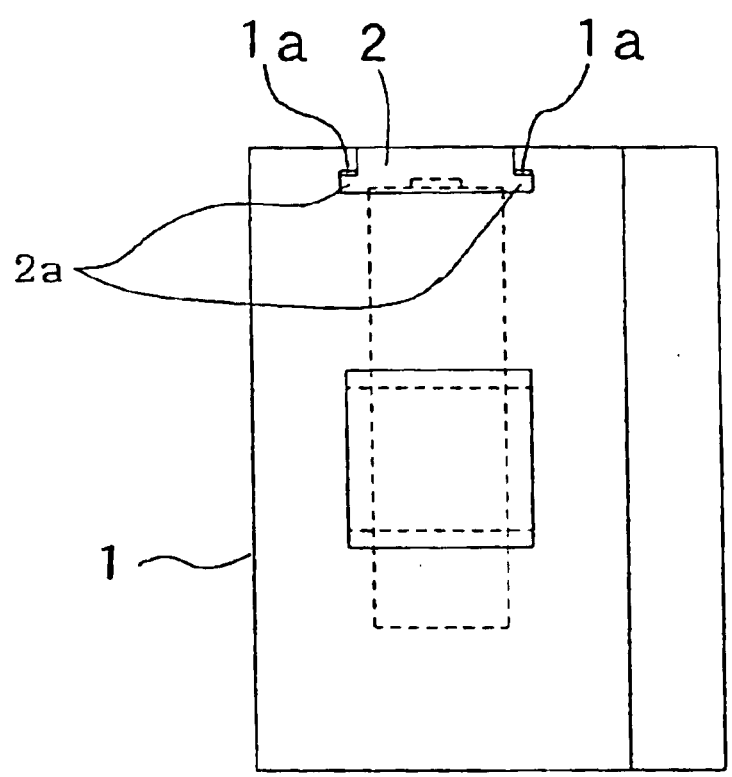
FIG. 3 is a bottom view of FIG. 2.

As shown in FIGS. 1 to 3, a battery chamber BC 1 is provided at a flash apparatus main body 1, with contact plates 3 to 5 provided at a wall surface of the battery chamber BC1. Four AA batteries E1 to E4 (1.5 V per battery) can be loaded into the battery chamber BC 1. The batteries are loaded into the battery chamber BC 1 through an opening at a side surface of the main body 1 and then a battery lid 2 is attached at the opening. Contact plates 6 and 7 are provided at an inner surface of the battery lid 2. The battery lid 2, which includes a pair of rail projections 2a provided on the two sides of its inner surface, is mounted at the main body 1 by interlocking the rail projections 2a at guide grooves 1a at the main body 1 and then sliding the battery lid 2 along direction B. The battery lid 2 is pulled out along direction A to disengage it from the main body 1.

As the battery lid 2 is attached, the four batteries become serially connected sequentially via the contact plate 3 at the main body, the contact plate 6 at the battery lid, the contact plate 4 at the main body, the contact plate 7 at the battery lid and the contact plate 5 at the main body, and thus, a source voltage equal to 1.5 V×4=6 V can be supplied.

Figure 4:
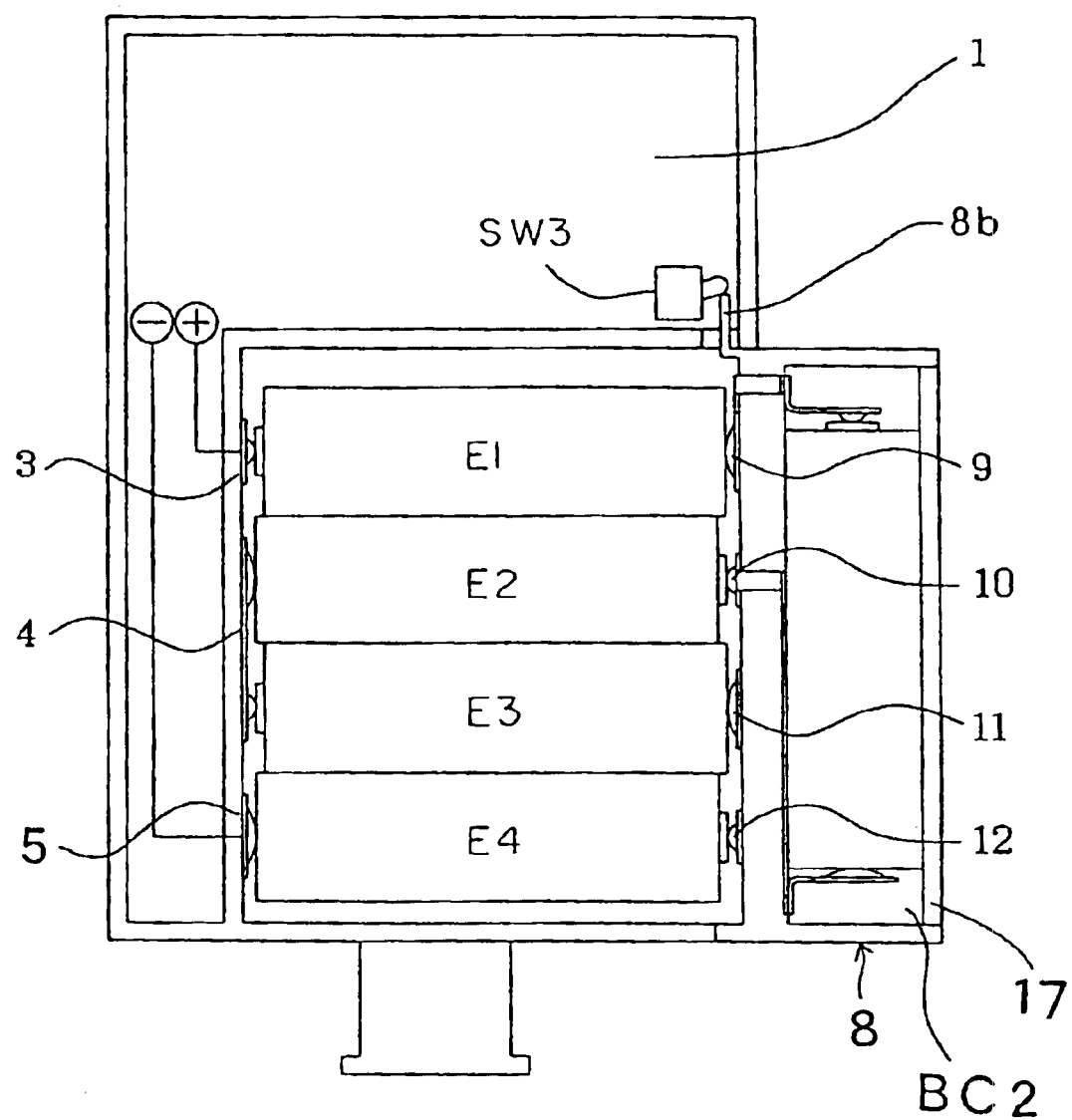
FIG. 4 is a frontal cross-section of the flash apparatus mounted with an auxiliary battery apparatus.
Figure 5:
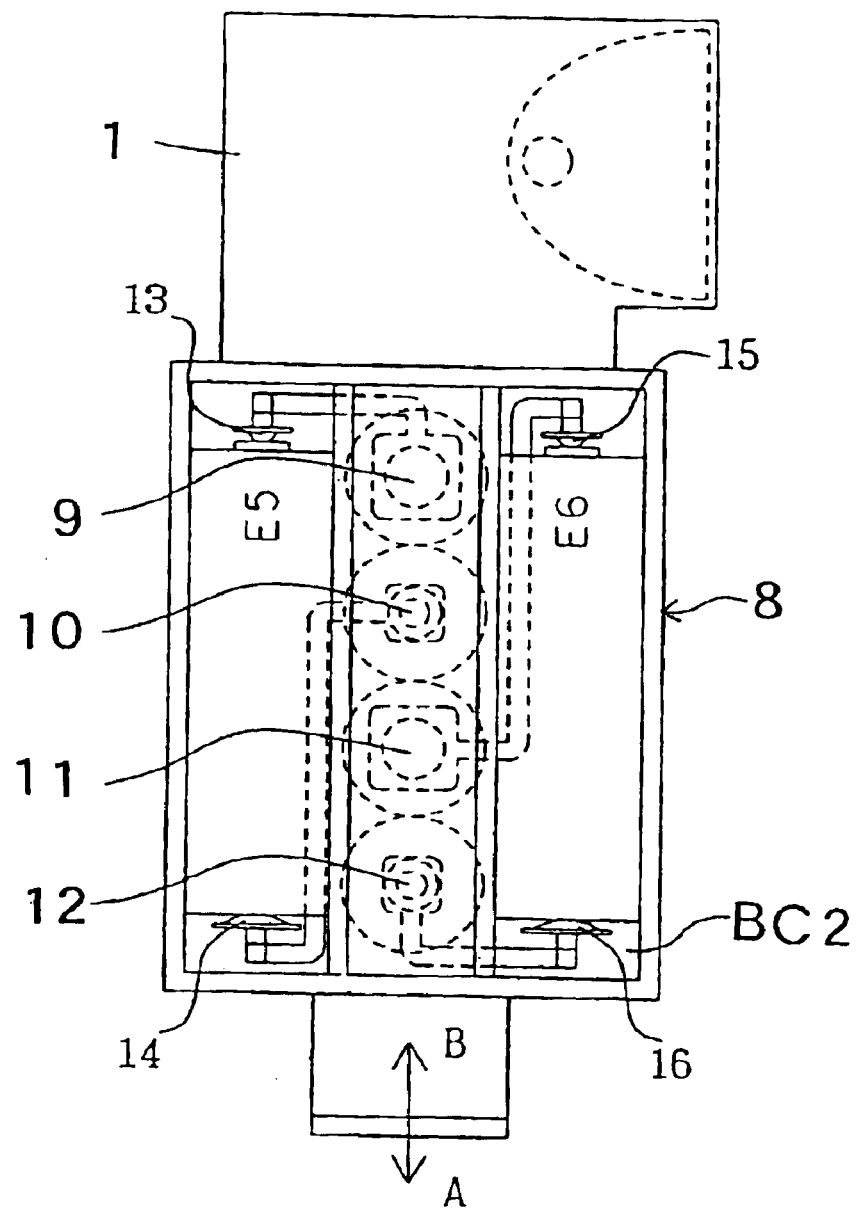
FIG. 5 is a right side elevation of FIG. 4.
Figure 6:
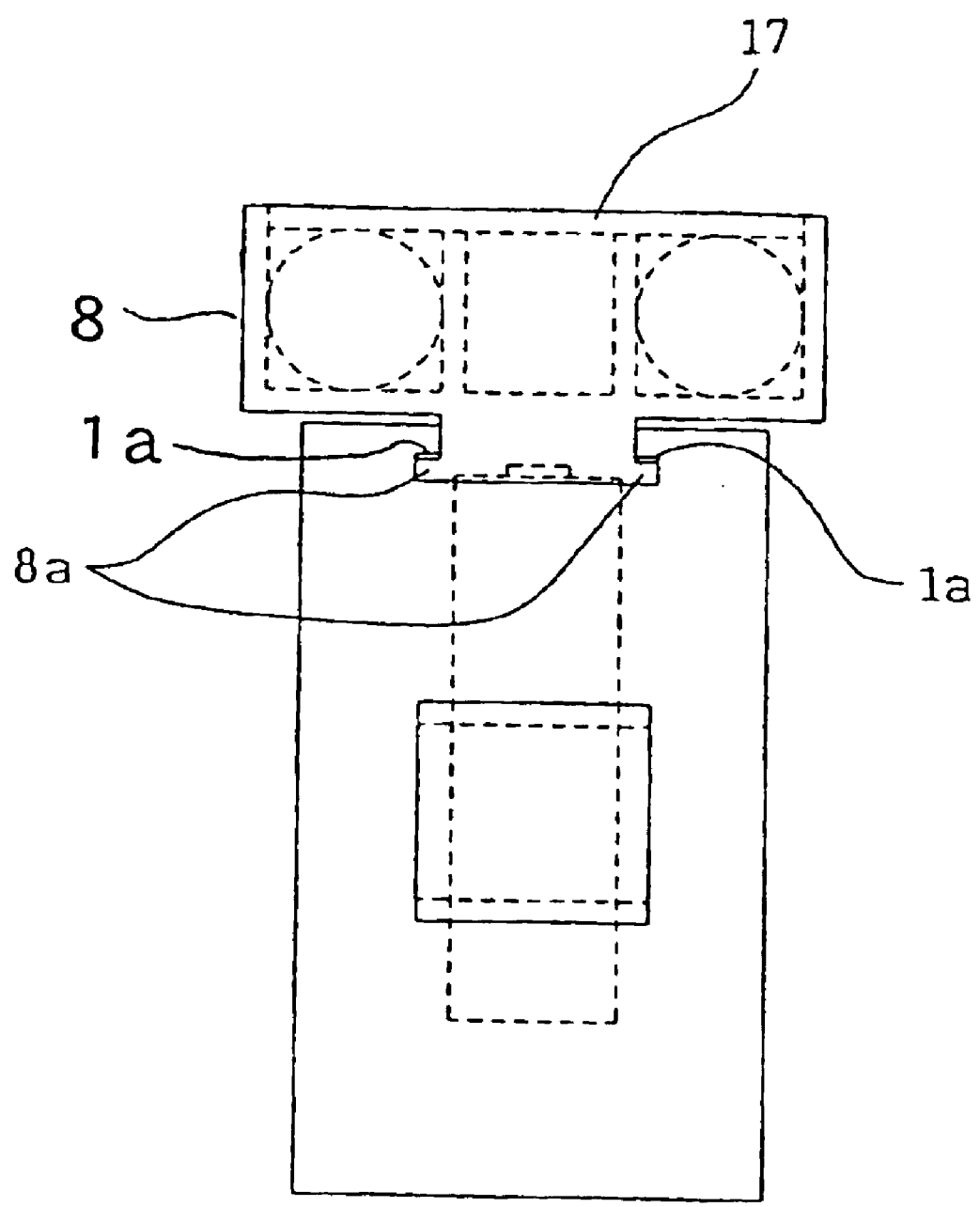
FIG. 6 is a bottom view of FIG. 5.

An auxiliary battery apparatus 8 shown in FIGS. 4 to 6 can be mounted at the main body 1 in place of the battery lid 2. The auxiliary battery apparatus 8 includes a battery chamber BC2 in which two AA batteries E5 and E6 can be housed and battery contact plates 9 to 16. In addition, a pair of rail projections 8a similar to those at the battery lid 2 are provided so as to allow the auxiliary battery apparatus 8 to be mounted at the main body 1 through a procedure similar to that with which the battery lid 2 is attached. Reference numeral 17 indicates a lid of the battery chamber BC2. As the auxiliary battery apparatus 8 is mounted, the six batteries become serially connected sequentially via the contact plate 3 at the main body, the contact plates 9, 13, 14 and 10 at the auxiliary battery apparatus, the contact plate 4 at the main body, the contact plates 11, 15, 16 and 12 at the auxiliary battery apparatus and the contact plate 5 at the main body and thus, a source voltage equal to 1.5 V×6=9 V can be supplied.

The auxiliary battery apparatus 8 also includes a switch changeover projection 8b used to effect a changeover at a switch SW 3 provided at the flash apparatus. The switch SW 3, which holds an OFF state when the auxiliary battery apparatus is not mounted, is turned on via the switch changeover projection 8b as the auxiliary battery apparatus is mounted. An ON/OFF signal indicating the state of the switch SW3 is input to a timer circuit 35 to be detailed later.

Figure 7:
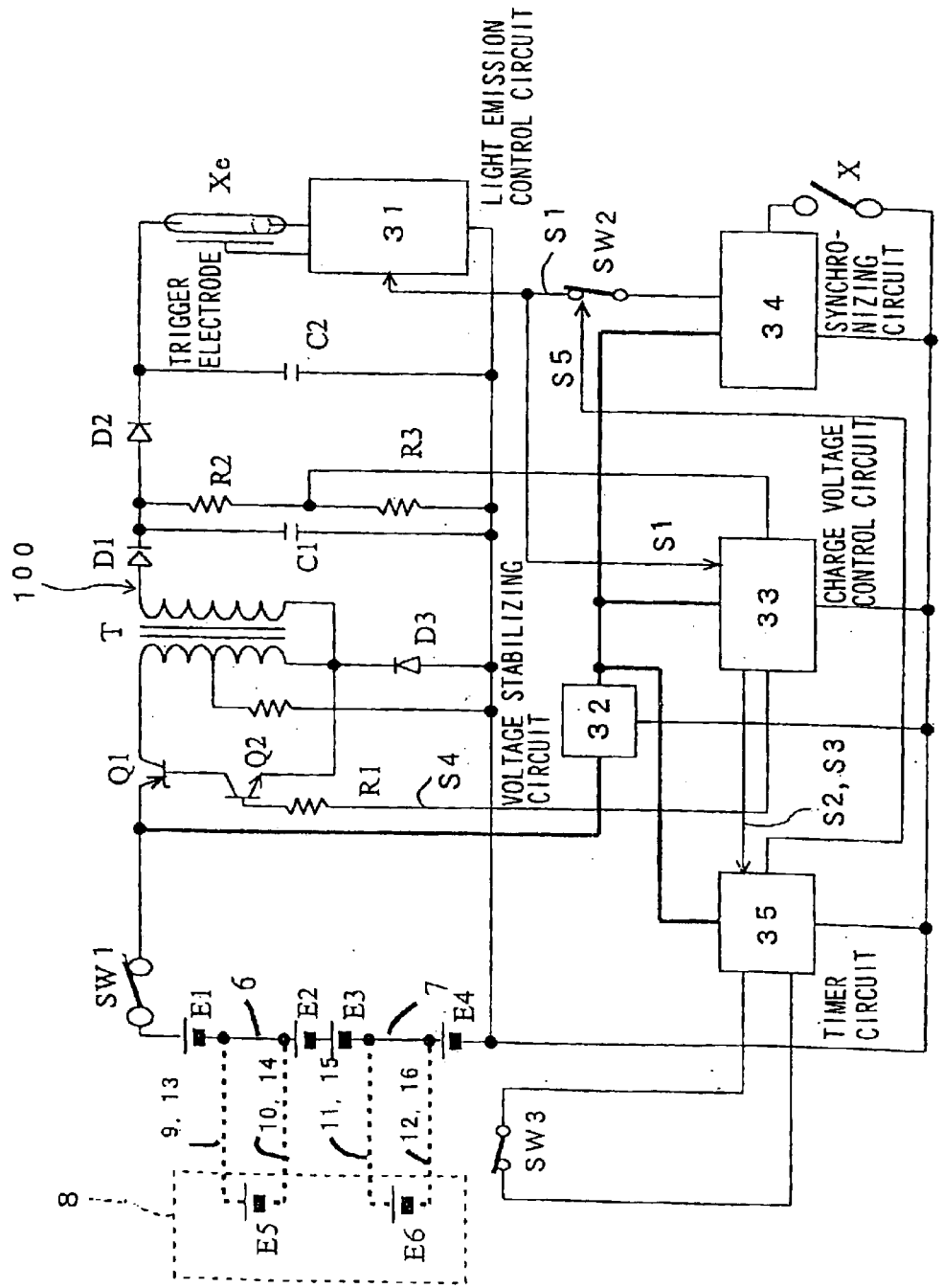
FIG. 7 is an electric circuit diagram of the flash apparatus.

FIG. 7 shows an electric circuit of the flash apparatus.

A voltage boosting transformer T, an oscillating transistor Q1, a transistor Q2 and diodes D1 and D3 constitute a DC/DC converter 100. As a power switch SW 1 is closed in the flash apparatus loaded with batteries, power is supplied to the DC/DC converter 100 and a voltage stabilizing circuit 32 from the batteries E1 to E4 (or E1 to E6) and the source voltage is boosted by the DC/DC converter 100 to charge a main capacitor C2. The voltage stabilizing circuit 32 implements control so as to sustain the output voltage at a constant level even when the voltage boosting operation causes the battery voltage to become lowered or even when the auxiliary battery apparatus 8 is connected to result in an increase in the source voltage. The voltage stabilizing circuit 32 may be constituted of, for instance, a switching regulator type circuit. Power sustaining a constant voltage level through the function of the voltage stabilizing circuit 32 is supplied to a charge voltage control circuit 33, a synchronizing circuit 34 and a timer circuit 35.

Reference numeral C1 indicates a small-capacity capacitor which is charged to achieve a voltage at a level substantially equal to the voltage level at the main capacitor C2. As a voltage achieved by dividing the voltage at the small-capacity capacitor C1 via resistors R2 and R3 reaches a predetermined level, the charge voltage control circuit 33 cuts off the electric continuity of the transistor Q2 by outputting a charge end signal S4 to the transistor Q2. As a result, the oscillating operation at the voltage boosting transistor Q1 stops and the charge operation for the main capacitor C2 is completed.

Subsequently, as a synchro switch X of a camera is closed following a photographing operation, the synchronizing circuit 34 inputs a light emission start signal S1 to a light emission control circuit 31 via a switch SW2. It is to be noted that the switch SW2, which is normally sustained in a closed state, is opened in response to a light emission prohibit signal S5 provided by the timer circuit 35 as described later.

The light emission control circuit 31 applies a high voltage to a trigger electrode of a xenon discharge tube Xe in response to the light emission start signal S1 and simultaneously connects a cathode of the xenon discharge tube Xe to the negative side of the main capacitor C2. As a result, light is emitted as the electric charge in the main capacitor C2 is discharged through the xenon discharge tube Xe. The light emission start signal S1 provided by the synchronizing circuit 34 is also input to the charge voltage control circuit 33. In response to the light emission start signal S1, the charge voltage control circuit 33 sets the transistor Q2 in an electrically continuous state. Thus, the transistor Q1 becomes electrically continuous to allow the DC/DC converter 100 to start recharging the main capacitor C2. Subsequently, the charge operation for the capacitor C2 is stopped as described earlier.

The charge voltage control circuit 33 outputs the signal S2 indicating a charge start and the signal S3 indicating a charge end to the timer circuit 35 respectively at a charge start time point and at a charge end time point. Based upon these signals S2 and S3, the timer circuit 35 detects the charge speed and the number of times light is emitted.

Figure 18:
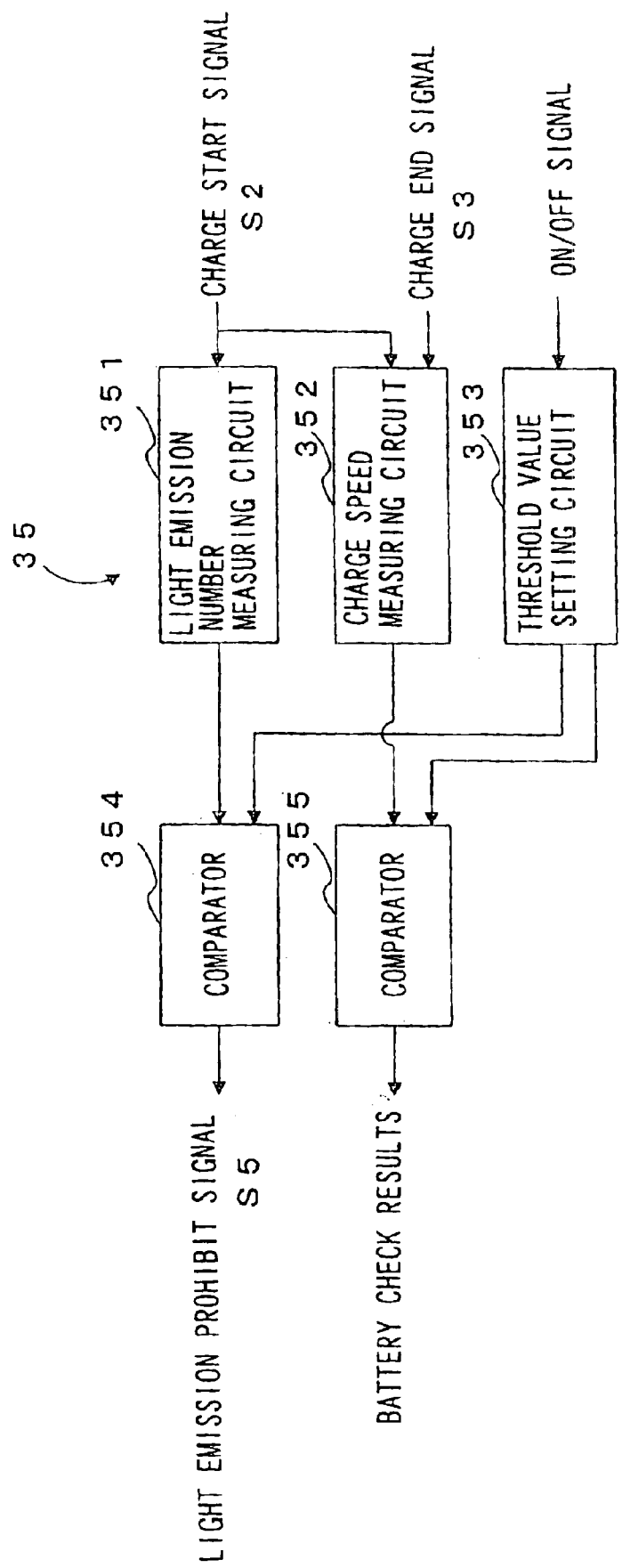
FIG. 18 is a block diagram illustrating the timer circuit in detail.

Now, in reference to FIG. 18, the timer circuit 35 is explained. FIG. 18 is a block diagram of a plurality of functions achieved by the timer circuit 35. Namely, the timer circuit 35 includes a light emission number measuring circuit 351, a charge speed measuring circuit 352, a threshold value setting circuit 353 and comparators 354 and 355.

The charge start signal S2 is input to the light emission number measuring circuit 351, which then measures the number of times light is emitted based upon the signal S2. The charge start signal S2 and the charge end signal S3 are input to the charge speed measuring circuit 352 which then measures the charge speed based upon the signals S2 and S3.

The comparator 354 compares the number of light emissions having been measured by the light emission number measuring circuit 351 with a threshold value set in advance by the threshold value setting circuit 353 and outputs the light emission prohibit signal S5 indicating a high level when the number of light emissions exceeds the threshold value. The comparator 355 compares the charge speed having been measured by the charge speed measuring circuit 352 with a threshold value set in advance by the threshold value setting circuit 353 and outputs a high level signal indicating that the battery power is becoming low (battery check results) when the charge speed becomes lower than the threshold value. The threshold value setting circuit 353 changes the threshold value based upon the ON/OFF signal from the switch SW 3. Namely, since the switch SW 3 is closed when the auxiliary battery apparatus 8 is mounted, the threshold value of the charge speed is raised. The threshold value setting circuit 353 also sets the threshold value for the number of light emissions at the comparator 354. The threshold value for the number of light emissions is raised when the auxiliary battery apparatus 8 is mounted.

Figure 8:
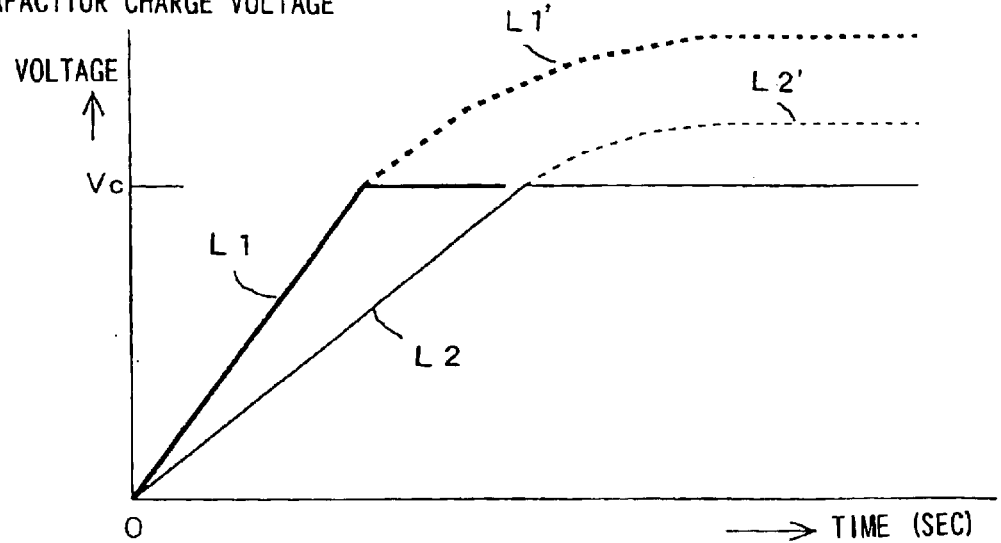
FIG. 8 shows the speeds at which charge is achieved when the auxiliary battery apparatus is mounted and when the auxiliary battery apparatus is not mounted.

FIG. 8 shows the difference between the length of time over which the main capacitor C2 is charged when the auxiliary battery apparatus 8 is used and the length of time over which the main capacitor C2 is charged when the auxiliary battery apparatus 8 is not used, with the charge voltage at the main capacitor C2 indicated along the vertical axis and time indicated along the horizontal axis. L1 indicates the charge state when the auxiliary battery apparatus is used, whereas L2 indicates the charge state when the auxiliary battery apparatus is not used. In either case, the charge operation starts at a time point 0 and as the charge voltage achieves a predetermined value Vc, the charge voltage control circuit 33 described earlier sets the transistor Q2 in an electrically discontinuous state, thereby stopping the charge operation. The length of charge time is shorter when the auxiliary battery apparatus is used since the source voltage is 9 V when the auxiliary battery apparatus is in use, whereas the source voltage is 6 V when it is not in use.

It is to be noted that L1' and L2' in the figure indicate the charge states that would manifest if the transistor Q2 was held in an electrically continuous state even after the charge voltage reached Vc.

Thus, since the charge operation can be completed faster by utilizing the auxiliary battery apparatus 8, flash photographing operations can be executed in quick succession to minimize missed photographing opportunities.

When flash photographing operations are continuously executed over short photographing intervals, the main capacitor C2 is charged and discharged repeatedly over short time intervals. Under such circumstances, a large current flows to the voltage boosting transformer T and the oscillating transistor Q1 of the DC/DC converter 100 and the xenon discharge tube Xe repeats the light emission discharge. Thus, the adverse effect of heat on various components becomes a serious concern.

As described above, the signal S2 indicating a charge start and the signal S3 indicating a charge end are input from the charge voltage control circuit 33 to the timer circuit 35. Using the signals S2 and S3, the timer circuit 35 measures the number of times the charge operation has been repeatedly executed and the integrated time length of the charge and controls light emission operations so as to ensure that no thermal damage occurs at the individual components. For instance, it may count the number of light emissions occurring over a predetermined time period based upon the signal S2 and open the switch SW2 by outputting the light emission prohibit signal S5 in order to forcibly prohibit a light emission when the number of light emissions exceeds a predetermined value.

In addition, the timer circuit 35 detects the speed at which the main capacitor C2 is charged based upon the signals S2 and S3 and executes a battery check based upon the detected charge speed. Basically, the timer circuit 35 judges that a sufficient level of battery power is available if the charge speed is high, whereas it judges that the battery power is becoming lower if the charge speed is low. The results of the battery check are displayed at a display device (not shown) in a three-step display which includes, for instance, "sufficient power remaining", "battery replacement due soon" and "replace battery".

The level of power remaining in the individual batteries at a given charge speed when the auxiliary battery apparatus 8 is engaged in operation is different from the level of power remaining in the individual batteries at the same charge speed when the auxiliary battery apparatus is not engaged in operation since the number of batteries being used is different. Accordingly, a decision is made as to whether or not the auxiliary battery apparatus 8 is mounted at the flash apparatus based upon the ON/OFF state of the switch SW 3 and the battery check results which also reflect the presence/absence of the auxiliary battery apparatus 8 are output (displayed) in the embodiment. More specifically, when the auxiliary battery apparatus is mounted, the charge speed threshold value used to judge the battery state is set higher than the threshold value setting selected when the auxiliary battery apparatus is not mounted. As a result, no erroneous indication that a sufficient level of power is still available is brought up when the auxiliary battery apparatus is used and the batteries are nearing the end of their service life, which ensures that the user is not caught off-guard by a sudden battery depletion while photographing. In addition, since the correct timing with which the batteries should be replaced is indicated regardless of whether or not the auxiliary battery apparatus is in use, the batteries are always replaced in a timely manner.

In summary, in the flash apparatus achieved in the first embodiment, the presence/absence of the auxiliary battery apparatus is detected and a battery check is executed based upon the detection results and the charge speed. Thus, the battery check can be executed with a high degree of accuracy in correspondence to the number of batteries being used to allow the user to ascertain the correct timing which the batteries should be replaced.

It is to be noted that the number of batteries that can be loaded in the auxiliary battery apparatus 8 is not limited to two and instead three or more batteries or a single battery may be loaded in the auxiliary battery apparatus 8. The threshold values set to determine the battery state when the auxiliary battery apparatus is mounted should be raised as the number of batteries loaded in the auxiliary battery apparatus 8 increases.

Second Embodiment

The second embodiment of the present invention is explained in reference to FIGS. 9 to 17.

Figure 9:
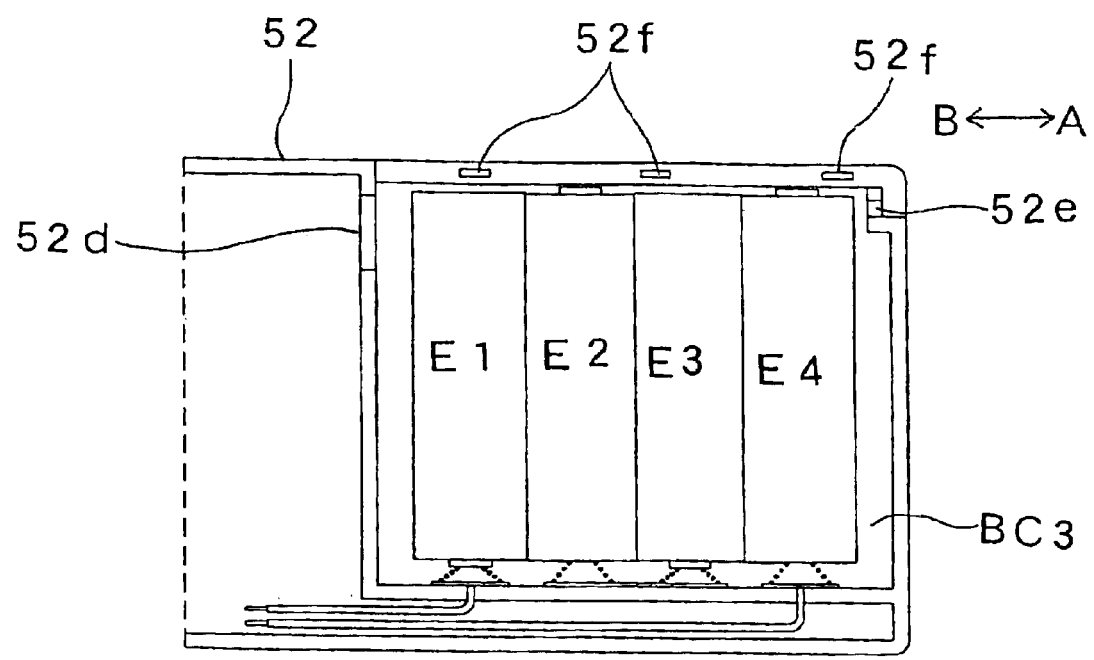
FIG. 9 is a partial sectional view of the flash apparatus achieved in a second embodiment of the present invention in a state in which the battery chamber lid is not attached.
Figure 10:
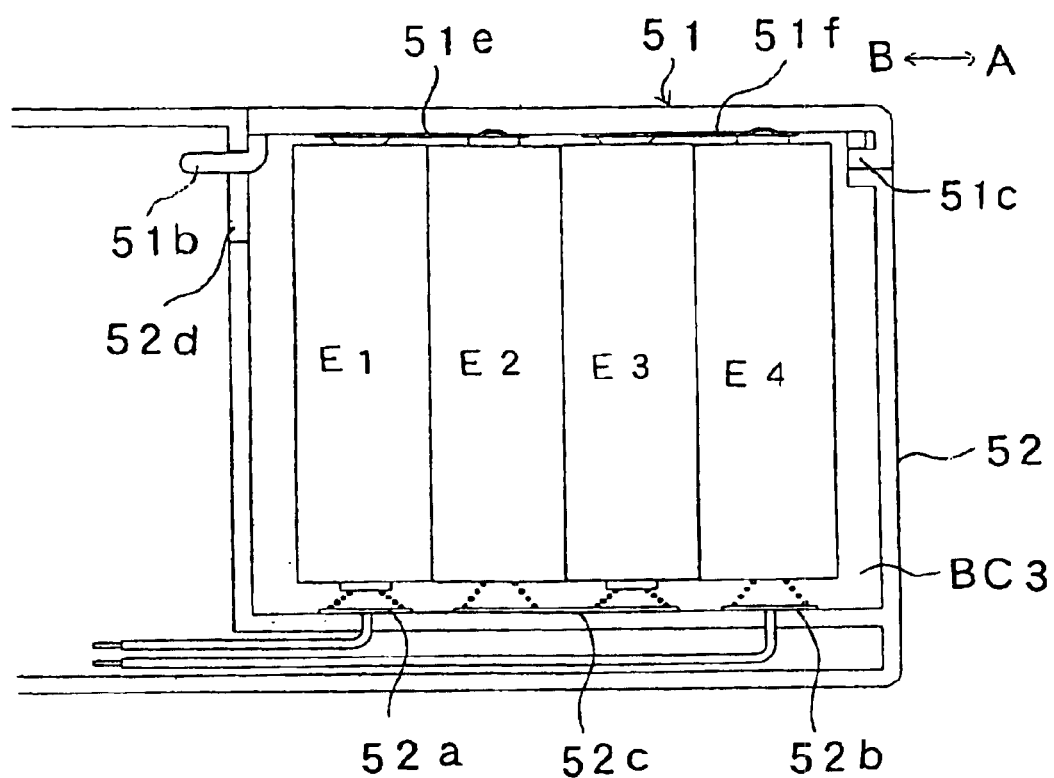
FIG. 10 is a view similar to that presented in FIG. 9, in a state in which the battery chamber lid is attached.
Figure 11:
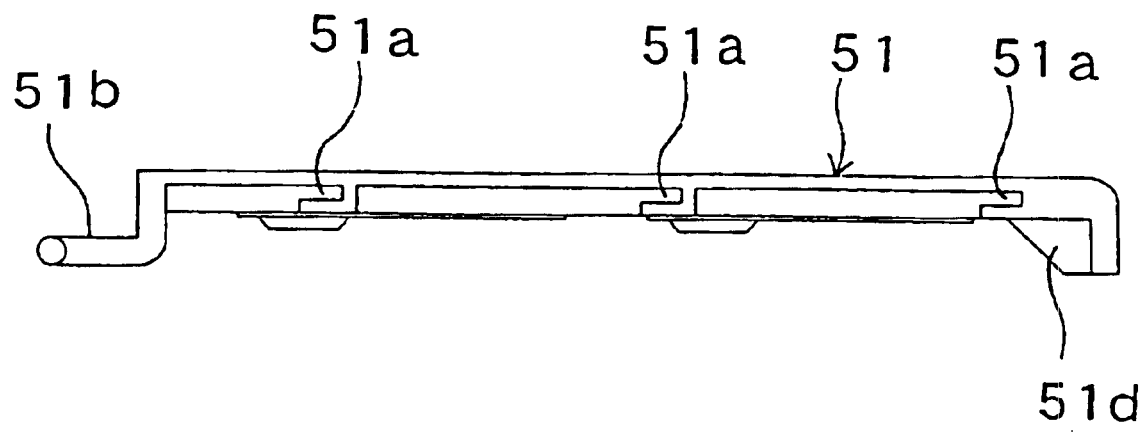
FIG. 11 shows the battery chamber lid.
Figure 12:
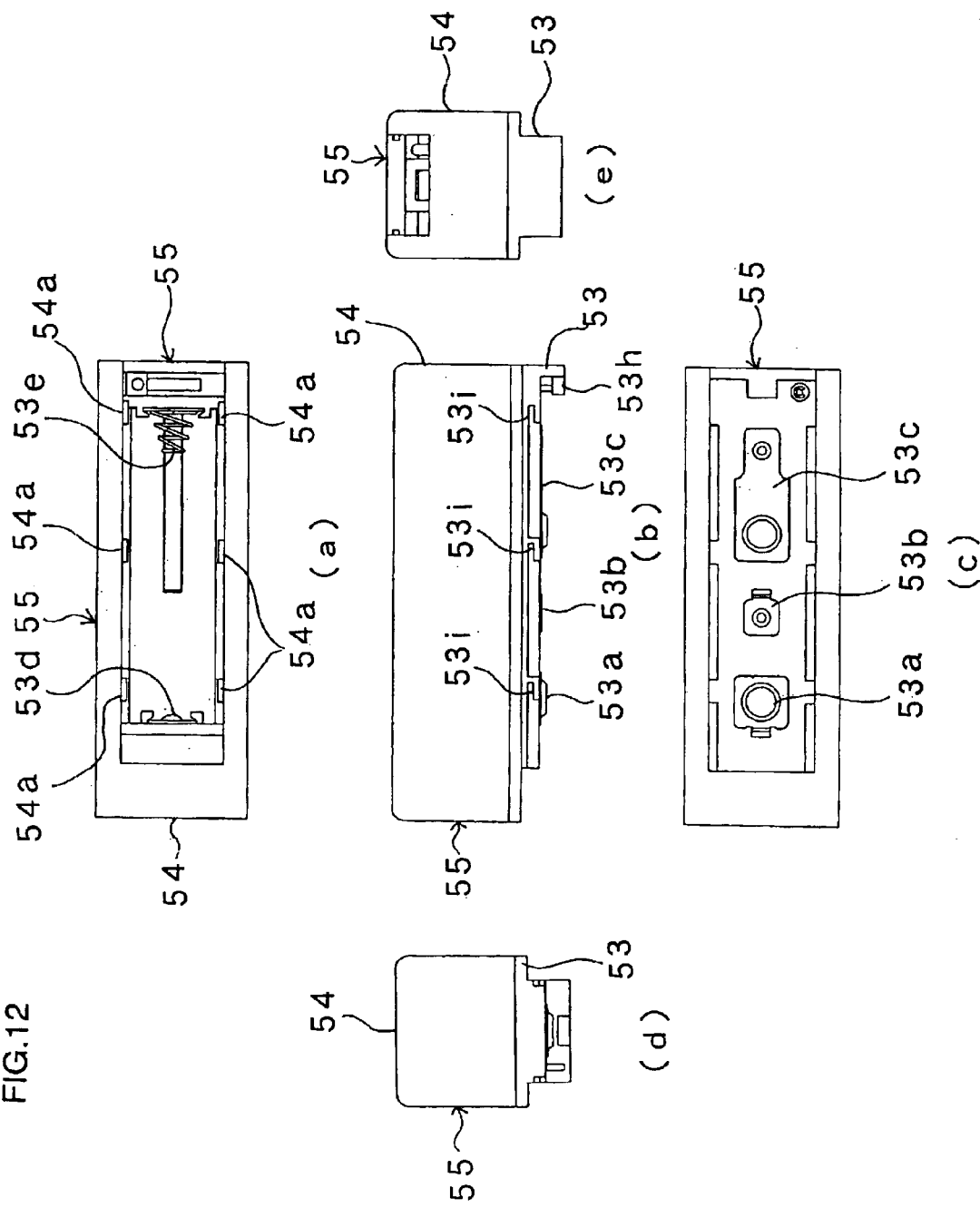
FIGS. 12A to 12E are respectively a plan view, a front view, a bottom view and left and right side elevations of the auxiliary battery apparatus achieved in the second embodiment.

FIGS. 9 and 10 show the structure of a battery chamber of a flash apparatus main body 52 and FIG. 11 shows a battery chamber lid 51. FIG. 9 shows the battery chamber without the battery chamber lid 51, whereas FIG. 10 shows the battery chamber with the battery chamber lid 51 attached thereto. Four batteries E1 to E4 (1.5 V per battery) can be loaded into the battery chamber BC3, and the battery chamber lid 51 is attached after the batteries are loaded. As the battery chamber lid 51 is placed at a battery chamber opening and slid along direction B, projections 52f at the main body become interlocked with locking grooves 51a at the lid and also, slip-preventing walls 51b and 51c become respectively interlocked at grooves 52d and 52e at the main body, thereby attaching the battery chamber lid 51 to the battery chamber. At this time, the four batteries E1 to E4 become serially connected sequentially via a contact plate 52a at the main body, a contact plate 51e at the battery chamber lid, a contact plate 52c at the main body, a contact plate 51f at the battery chamber lid and a contact plate 52b at the main body and thus, it becomes possible to supply a source voltage of 1.5 V×4 =6 V.

Figure 13:
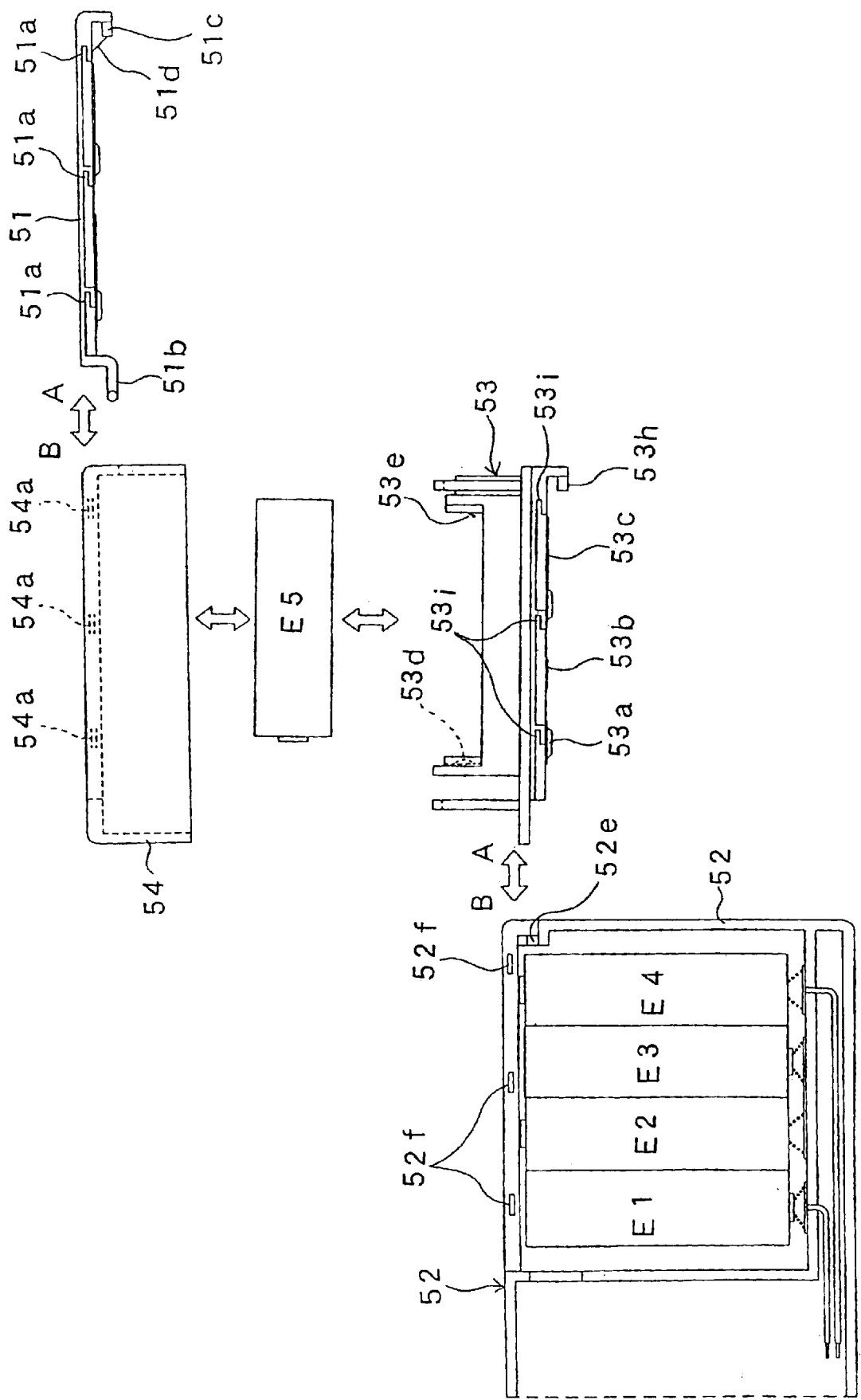
FIG. 13 illustrates the procedure through which the auxiliary battery apparatus is mounted at the flash apparatus.

FIGS. 12A–12E show an auxiliary battery apparatus achieved in the embodiment and FIG. 13 shows the procedure through which the auxiliary battery apparatus is mounted at the flash apparatus main body 52. The auxiliary battery apparatus 55 includes a battery loading unit constituted of a battery support bed 53 and a cover 54. The battery support bed 53 and the cover 54 are separate members which are fitted together to constitute an integrated unit as the auxiliary battery apparatus 55 is mounted at the flash apparatus main body 52.

At the battery support bed 53, positive/negative battery contact plates 53d and 53e are provided to face opposite each other and a single battery E5 is supported between the contact plates. In addition, battery contact plates 53a to 53c used to achieve a connection with the batteries in the flash apparatus main body 52, locking grooves 53i at which the support bed 53 is detachably connected to the flash apparatus main body 52 and a slip-preventing wall 53h are formed at the lower surface of the battery support bed 53. Since the battery support bed 53 is mounted at the main body 52 in place of the battery chamber lid 51, the structure of the locking grooves 53i is identical to the structure of the corresponding grooves at the battery chamber lid 51.

The cover 54 is positioned and set at the battery support bed 53 so as to enclose the battery E5 inside. An opening is formed at the top surface of the cover 54, and projections 54a are formed around the opening to be used to attach the battery chamber lid 51 of the flash apparatus main body 52. The structure of these projections 54a is identical to the structure of the projections 52f provided at the battery chamber opening at the main body 52.

Figure 14:
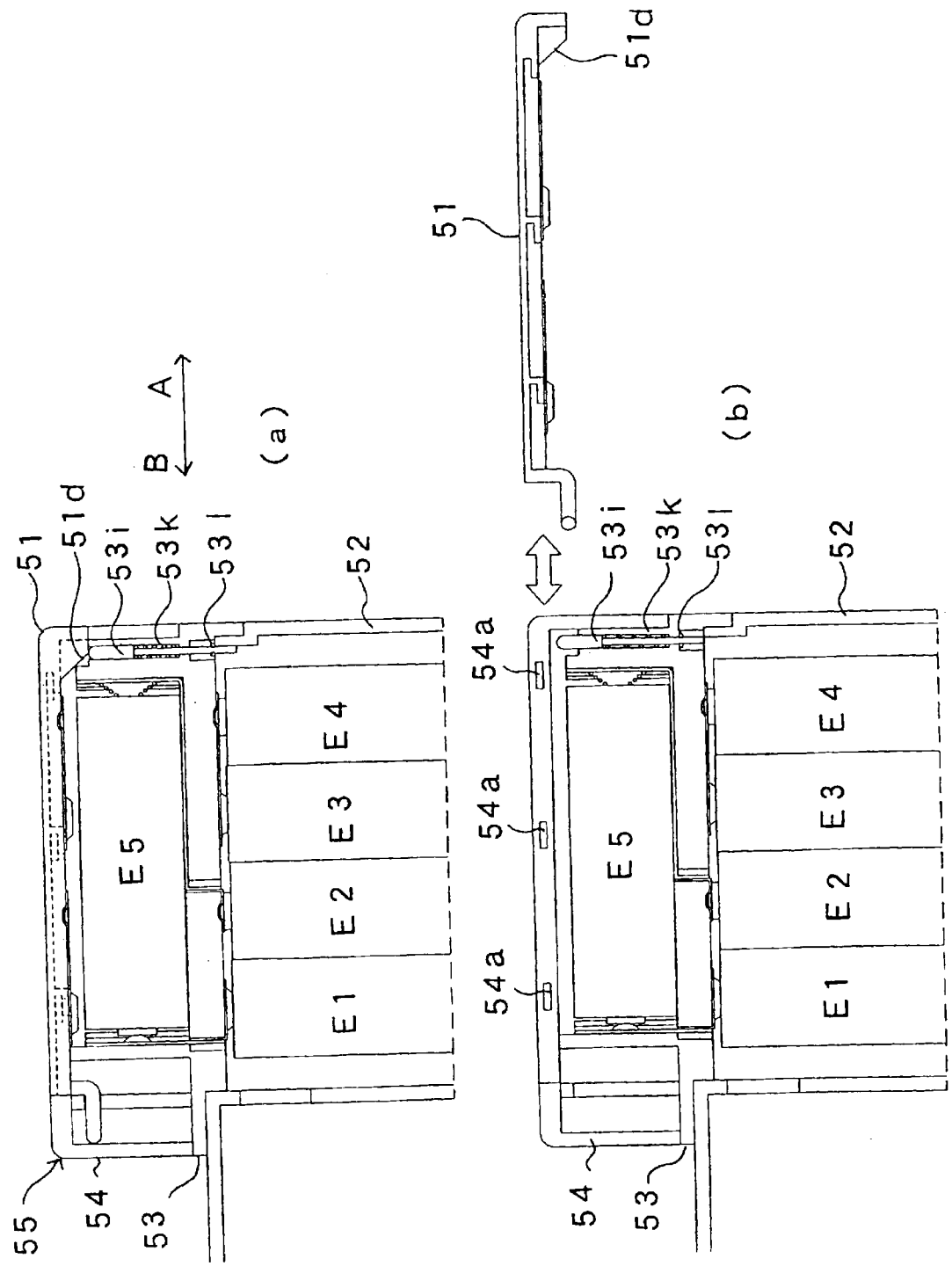
FIGS. 14A and 14B illustrate the lock mechanism of the auxiliary battery apparatus.

In addition, a lock mechanism such as that shown in FIG. 14 is provided at the auxiliary battery apparatus 55. The lock mechanism includes a lock pin 53j supported at the battery support bed 53 so as to be allowed to move up and down, a lock spring 53k that applies an upward force to the lock pin 53j and a lock pin slip-preventing ring 53l, and prevents the auxiliary battery apparatus 55 from being inadvertently disengaged by engaging the lock pin 53j to the main body. The lock pin 53j becomes engaged with the main body as it is pressed against a sloping surface 51d formed at the battery chamber lid 51 (details are to be provided later).

Now, in reference to FIG. 13, the procedure through which the auxiliary battery apparatus 55 is mounted at and dismounted from the flash apparatus main body 52 is explained.

Before mounting the auxiliary battery apparatus 55, the battery chamber lid 51 is first disengaged from the battery chamber opening of the flash apparatus main body 52. With the four batteries E1 to E4 still loaded in the battery chamber BC3, the battery support bed 53 is placed at the battery chamber opening at the flash apparatus main body 52 and slid along direction B to engage the projections 52f into the grooves 53i and engage the slip-preventing wall 53h into the groove 52e at the main body. As a result, the battery support bed 53 becomes mounted at the battery chamber opening.

Figure 15:
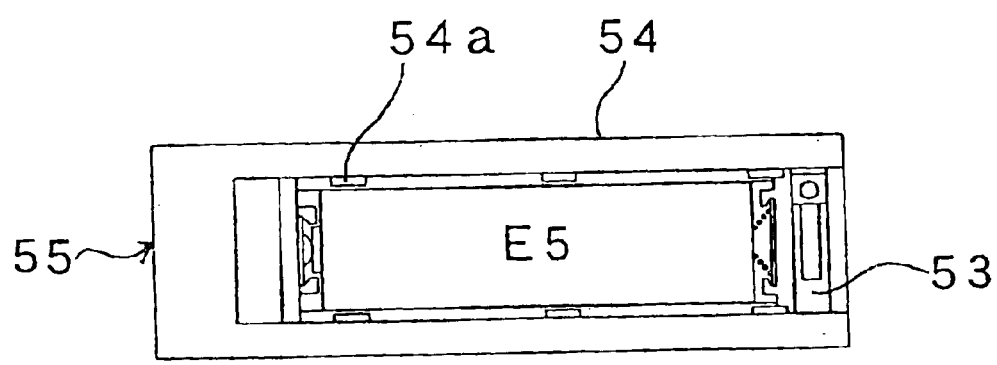
FIG. 15 is a plan view of the auxiliary battery apparatus with a battery loaded therein.

Next, with the battery E5 supported on the battery support bed 53, the cover 54 is placed at the battery support bed 53 so as to enclose the battery E5 (see FIG. 15). Then, the battery chamber lid 51 having been disengaged is placed at the opening at the top surface of the cover 54 and is slid along direction B so as to engage the projections 54a at the cover 54 into the grooves 51a and engage the slip-preventing walls 51b and 51c into the grooves 53f and 53g at the battery support bed 53 respectively (see FIG. 16). Thus, as the battery chamber lid 51 is mounted, the battery support bed 53 and the cover 54 come to constitute an integrated unit via the battery chamber lid 51 and the battery E5 at the battery support bed 53 becomes completely concealed (see FIGS. 17A and 17B).

Then, the sloping surface 51d provided at one end of the battery chamber lid 51 presses the lock pin 53j against the force applied by the spring 53k by interlocking with the attachment of the battery chamber lid 51, causing the front end of the lock pin 53j to become engaged into an engaging portion of the main body (see FIG. 14A). Thus, any sliding movement of the auxiliary battery apparatus 55 along direction A becomes disallowed to prevent the auxiliary battery apparatus 55 from falling inadvertently.

Figure 16:
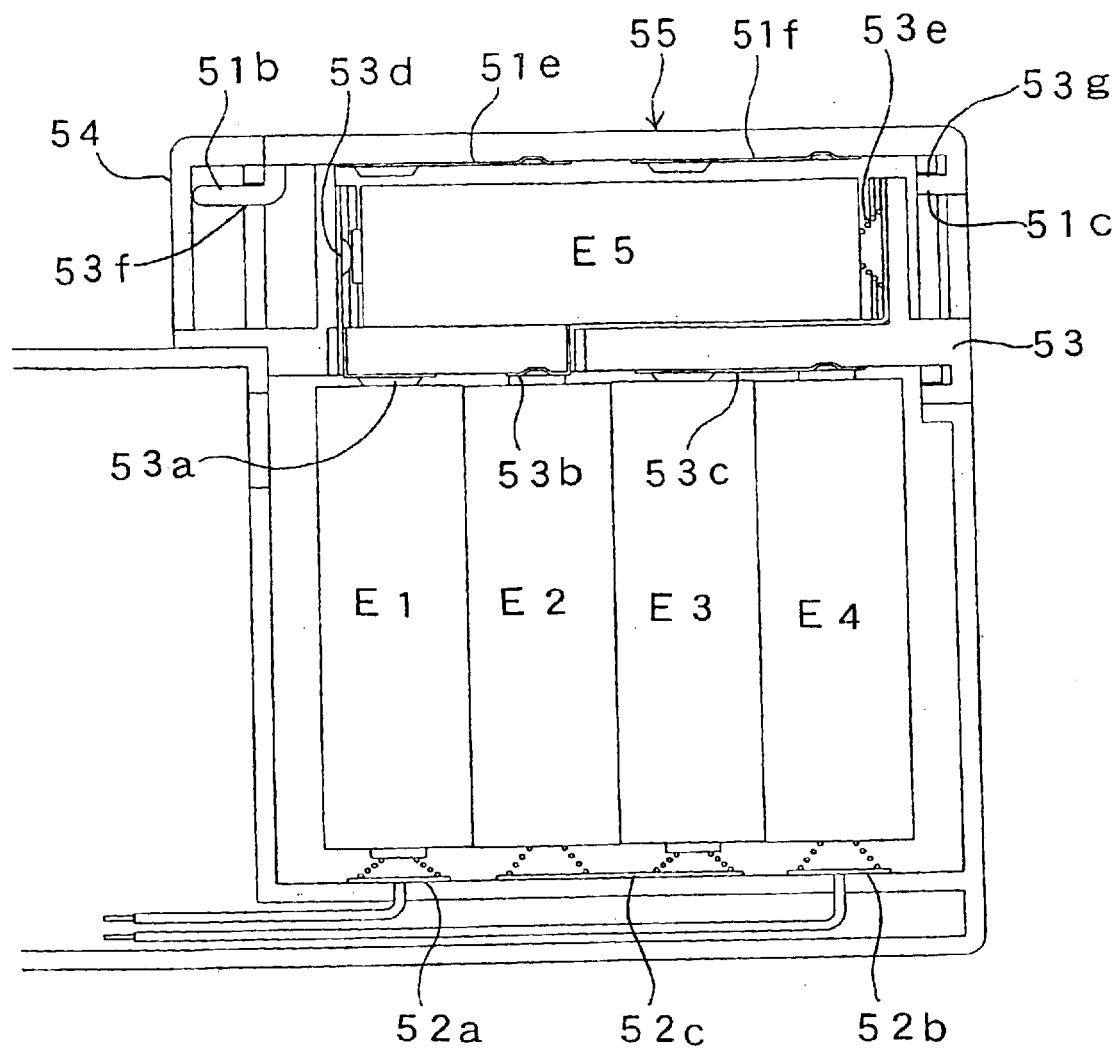
FIG. 16 is a sectional view illustrating the path along which the power is supplied when the auxiliary battery apparatus is mounted at the flash apparatus.
Figure 17:
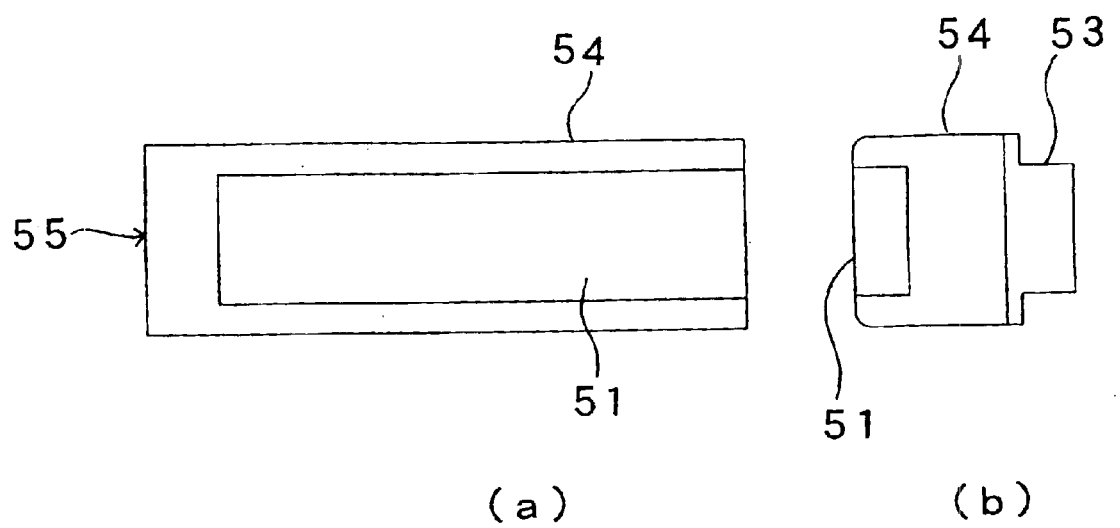
FIGS. 17A and 17B are respectively a plan view and a side elevation of the auxiliary battery apparatus with the battery chamber lid attached thereto.

As shown in FIG. 16, when the auxiliary battery apparatus 55 is mounted, the five batteries E1 to E5 are connected in series sequentially via the contact plate 52a at the flash apparatus main body, the contact plates 53a, 53d, 53e and 53b at the auxiliary battery apparatus, the contact plate 52c at the main body, the contact plate 53c at the auxiliary battery apparatus and the contact plate 52b at the main body and thus, a source voltage of 1.5 V×5=7.5 V can be supplied. Since the source voltage that is supplied when the auxiliary battery apparatus 55 is not mounted is 6 V, the length of time required to charge the main capacitor can be reduced and consequently, light can be emitted successively over short time intervals by mounting the auxiliary battery apparatus 55. It is to be noted that at this time, the battery contact plates 51e and 51f at the battery chamber lid 51 are not utilized.

As described above, the battery chamber lid 51 of the flash apparatus main body 52 must always be attached to the auxiliary battery apparatus 55 when the auxiliary battery apparatus 55 is used in the embodiment. Unless the battery chamber lid 51 is attached, the cover 54 cannot be integrated with the battery support bed 53 and, as a result, the battery E5 becomes exposed. For this reason, the battery chamber lid 51 having been disengaged from the main body 52 is never stored by itself and the battery chamber lid 51 is thus reliably prevented from becoming misplaced. In addition, the auxiliary battery apparatus 55 becomes locked to the flash apparatus main body 52 as the battery chamber lid 51 is attached. In other words, the auxiliary battery apparatus 55 can be used in operation only when it is locked to the flash apparatus main body 52, thus the auxiliary battery apparatus 55 is never used in an unlocked state and does not become disengaged from the flash apparatus main body 52 inadvertently.

Next, the operation executed when replacing the batteries is explained.

While the auxiliary battery apparatus 55 needs to be disengaged from the flash apparatus main body 52 when replacing the batteries, the auxiliary battery apparatus 55 having been locked with the lock mechanism described above must be first unlocked. The lock is released by removing the battery chamber lid 51 from the cover 54. Namely, as shown in FIG. 14B, the force pressing on the lock pin 53j is released as the battery chamber lid 51 is removed, thereby allowing the force applied by the spring 53k to move the lock pin 53j upward. As a result, the front end of the lock pin 53j retreats from the engaging portion at the flash apparatus main body 52. At the same time, since the battery support bed 53 and the cover 54 no longer constitute an integrated unit without the battery chamber lid 51 and the cover 54 and the battery support bed 53 become separated from each other, the battery E5 becomes exposed to the outside. In this state, the battery support bed 53 is slid along direction A and is disengaged from the flash apparatus main body 52, and then the batteries are replaced.

As described above, the battery chamber lid 51 must first be detached before the auxiliary battery apparatus 55 can be disengaged from the flash apparatus main body 52. The battery E5 inside the auxiliary battery apparatus 55 becomes exposed to the outside as the battery chamber lid 51 is detached. Thus, the user is reminded that the battery E5 inside the auxiliary battery apparatus 55 as well as the batteries E1 to E4 in the flash apparatus main body 52 needs to be replaced. In addition, since the cover 54 becomes separated from the battery support bed 53 when the battery chamber lid 51 is detached, the battery at the battery support bed 53 can be accessed easily for replacement.

If a structure that allows the auxiliary battery apparatus 55 to be disengaged from the flash apparatus main body 52 while the battery E5 remains concealed was adopted, the user might only remember to replace the batteries in the flash apparatus main body 52 and fail to replace the battery in the auxiliary battery apparatus 55. In such an event, there would be the risk of the battery inside the auxiliary battery apparatus 55 that has been completely discharged being used when the auxiliary battery apparatus 55 was engaged in operation again, resulting in a reverse charge of the battery, generation of an internal gas caused by the pole reversal phenomenon and ultimately problems such as a liquid leak. Since the structure that prompts the user to replace the battery in the auxiliary battery apparatus 55 is adopted, such problems do not occur in the embodiment.

It is to be noted that an example in which the battery support bed 53 and the cover 54 come to constitute an integrated unit as the battery chamber lid 51 is attached is explained in reference to the second embodiment, the auxiliary battery apparatus 55 may instead include a battery loading unit constituted of the battery support bed 53 and the cover 54 formed as a permanent integrated unit. In such a case too, the battery becomes exposed through the upper opening unless the battery chamber lid 51 is attached to remind the user that the battery in the auxiliary battery apparatus also needs to be replaced. In addition, while the battery chamber lid of the flash apparatus main body is attached at the auxiliary battery apparatus in the example explained above, the lid attached to the auxiliary battery apparatus may be a special lid provided as a member independent of the flash apparatus main body. Furthermore, the number of the batteries that can be loaded into the auxiliary battery apparatus may be two or more.

While the battery in the auxiliary battery apparatus is connected in series with the batteries in the flash apparatus in the example explained above, the battery in the auxiliary battery apparatus in the second embodiment may instead be connected in parallel. The present invention may also be adopted in an auxiliary battery apparatus that can be mounted at an electric apparatus other than a flash apparatus.

What is claimed is:

1. A flash apparatus, comprising:
    a light emission unit that emits light with an electric charge stored at a main capacitor;
    a battery chamber in which an internal battery constituting a source battery is loaded;
    a mounting unit at which an auxiliary battery apparatus having loaded therein an external battery to be connected in series with the internal battery is detachably mounted; and
    a detector that detects whether the auxiliary battery apparatus is mounted.

2. A flash apparatus according to claim 1, further comprising:
    a battery check circuit that detects a charge speed at which the main capacitor is charged and generates one of an output corresponding to remaining battery power available in the internal battery and an output corresponding to remaining battery power available in the internal battery and the external battery based upon the charge speed and results of a detection executed by the detector.

3. A flash apparatus according to claim 2, wherein:
    the battery check circuit generates the output corresponding to the remaining battery power by comparing the charge speed having been detected with a threshold value for battery check.

4. A flash apparatus according to claim 3, wherein:
    the threshold value is set higher if the detector detects that the auxiliary battery apparatus is mounted than the threshold value set when the detector does not detect that the auxiliary battery apparatus is mounted.

5. A flash system with an auxiliary battery, comprising:
    a flash apparatus that comprises a light emission unit that emits light with an electric charge stored at a main capacitor; a battery chamber in which an internal battery constituting a source battery is loaded; a mounting unit at which an auxiliary battery apparatus is detachably mounted; and a detector that detects whether the auxiliary battery apparatus is mounted; and
    the auxiliary battery apparatus having loaded therein an external battery to be connected in series with the internal battery, wherein:

the internal battery and the external battery are each a cylindrical battery;

an internal battery space where a plurality of cylindrical batteries are loaded side-by-side in a row is provided at the battery chamber; and an external battery space where a single cylindrical battery constituting the external battery is loaded so as to allow an axial center of the external battery to extend along a direction of the row in which the plurality of cylindrical batteries are arranged is formed at the auxiliary battery apparatus.

6. An auxiliary battery apparatus detachably mounted at an electric apparatus, comprising:

a battery loading unit having an external battery loaded therein, that is detachably mounted at the electric apparatus in place of a lid of a battery chamber of the electric apparatus;

an electric connection member that connects the external battery loaded in the battery loading unit to an internal battery loaded in the battery chamber of the electric apparatus when the battery loading unit is mounted; and a lid mounting unit provided at the battery loading unit, at which the lid is attached, wherein:

when the lid is attached to the lid mounting unit, the battery in the battery loading unit becomes concealed.

7. An auxiliary battery apparatus according to claim 6, further comprising:

a lock mechanism that disallows removal of the battery loading unit from the electric apparatus by interlocking with attachment of the lid to the battery loading unit and allows the battery loading unit to be disengaged by interlocking with detachment of the lid.

8. An auxiliary battery apparatus according to claim 6, wherein:

the battery loading unit includes a battery support bed that supports the external battery and is detachably mounted at the electric apparatus; and a battery cover that is positioned and set so as to enclose the external battery supported by the battery support bed, wherein:

as the battery cover is positioned and set at the battery support bed and the lid is attached at the battery cover, the battery support bed and the battery cover come to constitute an integrated unit via the lid, and the battery support bed and the battery cover cease to constitute the integrated unit when the lid is disengaged.

9. An auxiliary battery apparatus according to claim 7, wherein:

the battery loading unit includes a battery support bed that supports the external battery and is detachably mounted at the electric apparatus; and a battery cover that is positioned and set so as to enclose the external battery supported by the battery support bed, wherein:

as the battery cover is positioned and set at the battery support bed and the lid is attached at the battery cover, the battery support bed and the battery cover come to constitute an integrated unit via the lid, and the battery support bed and the battery cover cease to constitute the integrated unit when the lid is disengaged.

10. An auxiliary battery apparatus according to claim 6, wherein:

the electric apparatus is a flash apparatus for a camera.

11. An electric system with an auxiliary battery, comprising:

an electric apparatus; and an auxiliary battery apparatus that comprises a battery loading unit having an external battery loaded therein, that is detachably mounted at the electric apparatus in place of a lid of a battery chamber of the electric apparatus; an electric connection member that connects the external battery loaded in the battery loading unit to the internal battery loaded in the battery chamber of the electric apparatus when the battery loading unit is mounted; a lid mounting unit provided at the battery loading unit, at which the lid is attached, and the external battery in the battery loading unit becoming concealed when the lid is attached to the lid mounting unit, wherein:

the internal battery and the external battery are each a cylindrical battery;

an internal battery space where a plurality of cylindrical batteries are loaded side-by-side in a row is formed at the battery chamber; and an external battery space where a single cylindrical battery constituting the external battery is loaded so as to allow an axial center of the external battery to extend along a direction of the row in which the plurality of cylindrical batteries are arranged is formed at the auxiliary battery apparatus.

12. An electric system with an auxiliary battery according to claim 11, wherein:

the electric apparatus is a flash apparatus for a camera.

* * * * *